United States Patent [19]

Tang

[11] Patent Number: 5,541,805
[45] Date of Patent: Jul. 30, 1996

[54] TIME DELAY CONTROL SWITCH FOR VERTICAL DEFLECTION IN TELEVISION RECEIVER

[75] Inventor: Pak C. Tang, Knoxville, Tenn.

[73] Assignee: Philips Electronics North America Corporation, New York, N.Y.

[21] Appl. No.: 415,219

[22] Filed: Mar. 28, 1995

Related U.S. Application Data

[63] Continuation of Ser. No. 288,134, Aug. 9, 1994, abandoned, which is a continuation of Ser. No. 14,191, Jan. 15, 1993, abandoned.

[51] Int. Cl.$^6$ .............................. H01F 13/00; H01J 29/70
[52] U.S. Cl. ................. 361/150; 315/389; 315/8
[58] Field of Search ...................... 361/150, 156; 315/8, 389, 397

[56] References Cited

U.S. PATENT DOCUMENTS

| | | | |
|---|---|---|---|
| 4,636,911 | 1/1987 | Truskalo | 361/150 |
| 4,700,114 | 10/1987 | Sutherland, II | 315/389 |
| 4,734,620 | 3/1988 | Hemme | 315/8 |
| 4,737,881 | 4/1988 | Haferl | 361/150 |

FOREIGN PATENT DOCUMENTS 0219287  10/1986  European Pat. Off. .

OTHER PUBLICATIONS

*SGS–Thomson Microelectronics*, TDA8172, Oct. 1988.
*Philips Consumer Electronics Company*, TA8745N/TA8850N.

*Primary Examiner*—Peter S. Wong
*Assistant Examiner*—Aditya Krishnan
*Attorney, Agent, or Firm*—Laurie E. Gathman

[57] ABSTRACT

In a television receiver, to prevent interference between the magnetic field used for degaussing and the magnetic field of the vertical yoke, a switch is used for delaying turning on the vertical deflection circuit during degaussing.

7 Claims, 1 Drawing Sheet

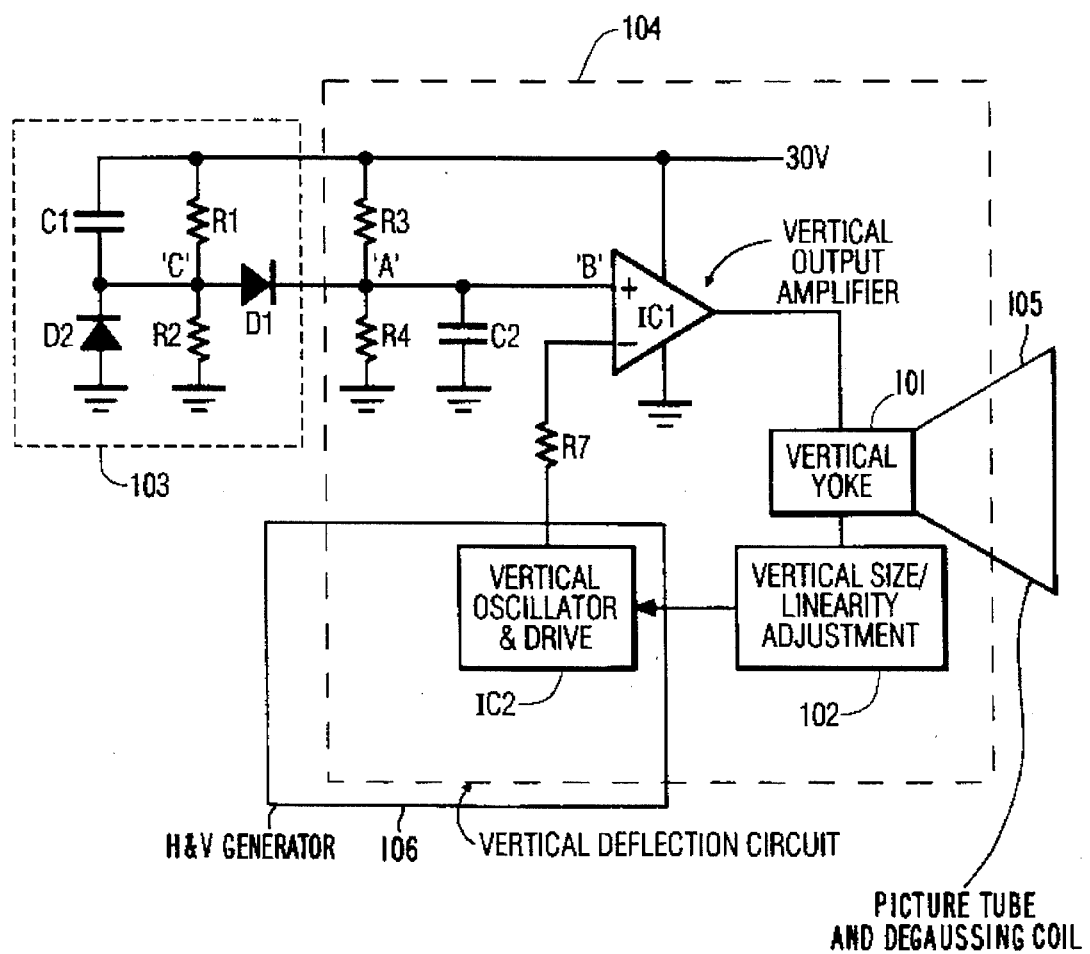

TIME DELAY CONTROL SWITCH FOR VERTICAL DEFLECTION IN TELEVISION RECEIVER

This is a continuation of application Ser. No. 08/288,134, filed Aug. 9, 1994 now abandoned which is a continuation of Ser. No. 08/014,191 filed Jan. 15, 1993 now abandoned.

I. BACKGROUND OF THE INVENTION

A. Field of the Invention

The present invention relates to degaussing a television receiver and in particular to preventing interference between the degaussing field and the magnetic field of the vertical yoke.

B. Related Art

Television receivers require degaussing for good beam registration on the picture tube.

The normal scheme used for degaussing includes a degaussing coil mounted at the dag of the picture tube. When the television receiver is switched "on", the degaussing coil is immediately activated and degaussing begins. The magnetic field generated by the degaussing coil is used to minimize beam registration error caused by other external magnetic fields. The total amount of time required to complete degaussing is about 350 milliseconds.

Any magnetic field present in the vertical yoke during degaussing would interfere with the magnetic field of the degaussing coil and cause error in beam registration.

European patent application EP-A 0 219 287 shows a circuit which delays turning on the V and H generator of a television receiver. In present television receivers, the V and H generator must work all the time, to increase reliability of the horizontal output transistor in the horizontal deflection circuit, regardless of whether the television receiver is on or off. Accordingly, the solution of EP-A 0 219 287 is no longer workable.

In U.S. Pat. No. 4,636,911, degaussing is attempted when the vertical deflection is near zero. However, some interference between the magnetic field of the degaussing coil and the magnetic field of the vertical yoke. Errors occurs which can result in errors in beam registration.

II. SUMMARY OF THE INVENTION

The object of the invention is to avoid errors in beam registration after degaussing without turning off the V and H generator 106.

The object is achieved by turning off vertical deflection during degaussing.

III. BRIEF DESCRIPTION OF THE DRAWING

The invention will now be described by way of non-limitative example with reference to the single drawing FIGURE, which depicts the preferred embodiment of the invention.

IV. DETAILED DESCRIPTION OF THE PREFERRED EMBODIMENTS

A circuit that will switch the vertical deflection circuit "off", during degaussing, and "on", after completion of degaussing is shown in the figure.

Capacitor C1, having a capacitance of 68 μF and resistor R1, having a resistance of 100 kΩ are connected in parallel. C1, R1, and resistor R3, which also has a resistance of 100 kΩ, are connected to a 30 V voltage source. Resistor R1 and capacitor C1 are tied together at point 'C'. Point 'C' is connected via diode D1 to point 'A' which is connected to the opposite side of resistor R3 from the voltage source. Point "A" is the input to the vertical deflection circuit 104.

Diode D2 and resistor R2, which has a resistance of 5.1 kΩ, are connected in parallel between point 'C' and ground. Resistor R4, which has a resistance of 10 kΩ, and capacitor C2, which has a capacitance of 0.22μF, are connected in parallel between point 'A' and ground.

Point 'A' is directly connected to point 'B', the positive input of vertical output amplifier IC1. The vertical output amplifier IC1 is preferably a TDA 8172, manufactured by S. G. S. Thomson. The vertical output amplifier IC1 is also powered by the 30 V voltage source. The negative input of IC1 is coupled via resistor R7, which has a resistance of 6.8 kΩ, to the vertical oscillator and drive IC2. IC2 is preferably the deflection section of the TA8745N or TA8750N made by Toshiba.

The output of vertical output amplifier IC1 is connected to the vertical yoke 101 coupled to picture tube are degaussing coil 105. A vertical size and linearity adjustment circuit 102 is coupled to both the vertical yoke 101 and the vertical oscillator and drive IC2.

When the television receiver is switched "on", circuit 103 which includes circuit elements C1, D2, R1, R2, and D1, delays switching "on" the vertical output amplifier IC1, hence there is no vertical deflection. The delay time for switching on the vertical output amplifier is determined mainly by the time constant of circuit elements R1, R2, R3, R4, and C1. When the delay time is over, the vertical output amplifier is switched on automatically. When the vertical output amplifier is "on", vertical deflection occurs.

The input reference voltage at point 'B' of the vertical deflection circuit is set at 2.7 V, which is determined by resistors R3 and R4 in normal operation. If this reference voltage is increased above 5 V, the vertical output amplifier is switched "off" and there will be no vertical magnetic yoke field present. When the television receiver is switched "on", the voltage at point 'B' is at 30 V, because the voltage across capacitor C1 cannot be charged instantaneously. Capacitor C1 begins to be charged, and the voltage at point B begins to decay exponentially. The amount of time, T, required for the voltage at point 'B' to decrease from 30 V to 5 V is approximately determined by the following equation:

$$T = 1.792\tau \text{ seconds}$$

where $$\tau = [(R1 \| R3) \| (R2 \| R4)] \times C1$$

With R1=100 kΩ, R2=5.1 kΩ, R3=100 kΩ, R4=10 kΩ, and C1=68 μF, this yields $$R1 \| R3 = (100 \times 100)/(100+100) k\Omega = 50 \ k\Omega$$

$$R2 \| R4 = (5.1 \times 10)/(5.1+10) k\Omega = 3.38 \ k\Omega$$

$$(R1 \| R3) \| (R2 \| R4) = (50 \times 3.38)/(50+3.38) = 3.17 \ k\Omega$$

$$\tau = (3.17 \times 10^3) \times (68 \times 10^{-6}) = 216 \times 10^{-3}$$

As a result the time delay is T=387 ms. Thus, when the TV receiver is switched on, the vertical output amplifier, IC1 is switched off for about 387 milliseconds, and degaussing will occur during this interval. The maximum time required for completion of degaussing is 350 ms.

When point B reaches 5 V, the vertical deflection is switched "on". Nevertheless, capacitor C1 continues to charge, and stops charging when point 'C' is 1.5 V, as determined by resistors R1 and R2. Diode D1 is then reversed biased and circuit 103 is completely electrically disconnected from the vertical deflection circuit.

When the television receiver is switched "off", C1 discharges through diode D2 instantaneously. This keeps the delay time consistent when the television receiver is switched "on" again.

Thus circuit 103 acts as a switch for turning the vertical deflection circuit on and off with a characteristic turn on time delay.

The particular circuit 103 is only one example of a switch that could embody the inventive concept described herein. Those of ordinary skill in the art might devise any number of other techniques for turning off vertical deflection during degaussing.

I claim:

1. A circuit for preventing registration errors in a television receiver that includes a V and H generator, which is continuously operative at least while the television receiver is on, and a vertical deflection circuit coupled to the V and H generator, said circuit comprising:

input means for receiving a power supply voltage;

output means for supplying a predetermined voltage level to the vertical deflection circuit of the television receiver for activating the vertical deflection circuit; and switch means, coupled between the input and output means, for delaying transmission of the predetermined voltage level to the vertical deflection circuit during a characteristic time delay period so that the vertical deflection circuit does not provide vertical deflection during the characteristic time delay period and the V and H generator remains operative during the characteristic time delay period.

2. The circuit of claim 1 wherein the characteristic time delay period is at least 350 ms.

3. The circuit of claim 1 wherein the switch means comprises a capacitor (C1) and a first resistor (R1) coupled in parallel to the input means and coupled together at a junction point ('C');

a second resistor (R2) coupled between the junction point and ground; and a diode (D1) coupled to allow current flow from the first junction point toward the output means.

4. The circuit of claim 3 further comprising a second diode (D2), coupled between the capacitor and ground, for discharging the capacitor, whereby the characteristic time delay remains substantially constant.

5. A television receiver, comprising:

a) a V and H generator, which is continuously operative at least while the television receiver is turned on:

b) a vertical deflection circuit connected to the V and H generator; and c) a circuit for preventing registration errors during a degaussing period, said circuit comprising i) input means for receiving a power supply voltage;

ii) output means for supplying a predetermined voltage level to the vertical deflection circuit; and iii) switch means, coupled between the input and output means, for delaying transmission of the predetermined voltage level to the vertical deflection circuit during a characteristic time delay period so that the vertical deflection circuit does not provide vertical deflection during the characteristic time delay period and the V and H generator remains operative during the characteristic time delay period.

6. The television receiver according to claim 5, wherein the switch means comprises a capacitor (C1) and a first resistor (R1) coupled in parallel to the input means and coupled together at a junction point ('C');

a second resistor (R2) coupled between the junction point and ground; and a diode (D1) coupled to allow current flow from the first junction point toward the output means.

7. The television receiver according to claim 6, further comprising a second diode (D2), coupled between the capacitor and ground, for discharging the capacitor, whereby the characteristic time delay remains substantially constant.

* * * * *